(12) United States Patent
Yang

(10) Patent No.: US 7,912,331 B1
(45) Date of Patent: Mar. 22, 2011

(54) INTEGRATED FIBER COLLIMATOR AND PASSIVE COMPONENTS

(75) Inventor: Long Yang, Union City, CA (US)

(73) Assignee: Capella Photonics, Inc., San Jose, CA (US)

( * ) Notice: Subject to any disclaimer, the term of this patent is extended or adjusted under 35 U.S.C. 154(b) by 85 days.

(21) Appl. No.: 12/173,199

(22) Filed: Jul. 15, 2008

(51) Int. Cl.
*G02B 6/26* (2006.01)

(52) U.S. Cl. ............... 385/39; 385/14; 385/27; 385/28; 385/33; 385/46; 385/47; 385/48; 385/129; 385/130; 385/131; 385/132

(58) Field of Classification Search ............ 385/33, 385/46–48, 129–132, 14, 27–28
See application file for complete search history.

(56) References Cited

U.S. PATENT DOCUMENTS

| | | | |
|---|---|---|---|
| 6,625,346 B2 | 9/2003 | Wilde | |
| 6,661,948 B2 | 12/2003 | Wilde | |
| 6,697,431 B1 | 2/2004 | Yoneyama | |
| 6,915,047 B1 * | 7/2005 | Mekis et al. | 385/48 |
| 6,999,663 B2 * | 2/2006 | Gage et al. | 385/48 |
| 7,116,859 B2 * | 10/2006 | Mino et al. | 385/22 |
| 7,164,859 B2 | 1/2007 | Belser et al. | |
| 7,263,253 B2 | 8/2007 | Davis et al. | |
| 7,283,694 B2 * | 10/2007 | Welch et al. | 385/14 |
| 7,340,122 B2 * | 3/2008 | Welch et al. | 385/14 |
| 7,366,368 B2 * | 4/2008 | Morrow et al. | 385/15 |
| 7,397,989 B2 * | 7/2008 | Maki | 385/40 |
| 7,435,013 B2 * | 10/2008 | Hirai et al. | 385/88 |
| 7,460,742 B2 * | 12/2008 | Joyner | 385/14 |
| 7,466,882 B2 * | 12/2008 | Kish et al. | 385/24 |
| 7,477,807 B2 * | 1/2009 | Welch et al. | 385/14 |
| 7,483,599 B2 * | 1/2009 | Kish et al. | 385/14 |
| 7,509,048 B2 * | 3/2009 | Turpin et al. | 398/83 |
| 7,512,295 B2 * | 3/2009 | Welch et al. | 385/14 |
| 7,519,246 B2 * | 4/2009 | Welch et al. | 385/14 |
| 7,574,080 B2 * | 8/2009 | Goodwill et al. | 385/24 |
| 7,636,522 B2 * | 12/2009 | Nagarajan et al. | 398/79 |
| 7,734,129 B1 * | 6/2010 | Rodgers et al. | 385/24 |
| 2007/0160321 A1 * | 7/2007 | Wu et al. | 385/24 |

OTHER PUBLICATIONS

Berlatzky et al., Tapping Light From Waveguides by Higher Order Mode Excitation and Demultiplexing, May 2006, IEEE Journal of Quantum Electronics, vol. 42, No. 5, pp. 477-482.*

* cited by examiner

*Primary Examiner* — Brian M. Healy
*Assistant Examiner* — Guy G Anderson
(74) *Attorney, Agent, or Firm* — JDI Patent; Joshua D Isenberg

(57) ABSTRACT

Passive optical components may be used to tap the optical power, e.g., from fibers of a wavelength switch system. The passive optical components are realized by a standard photonics light-wave circuit (PLC) integrated to the fiber collimator array of the wavelength switch system. The PLC includes multiple waveguide paths that optically couple optical signals from one or more fiber ports to one or more corresponding free space optical component ports. Optical signals traveling through these waveguide paths are tapped by one or more optical taps and coupled to one or more corresponding tap ports. Each optical tap is located such that an optical signal is tapped after it is coupled into one of the waveguide paths.

15 Claims, 5 Drawing Sheets

INTEGRATED FIBER COLLIMATOR AND PASSIVE COMPONENTS

FIELD OF THE INVENTION

This invention relates to optical systems employing MEMS mirror arrays or liquid crystal arrays to couple light from input fibers to output fibers using collimators and free space optics.

BACKGROUND OF THE INVENTION

Wavelength switch systems (WSS) currently require passive optical components to tap the optical power from their fibers and feed these tapped signals to a monitoring system. The tapped signals are used to provide a feedback signal to control the WSS. Generally, there are two approaches to obtaining these feedback signals. The first approach includes an external optical channel monitoring (OCM) system that operates nearly independently of the WSS. A servo system responsive to external electronics controls the micromirrors of the WSS and serves the function of integrating the WSS and the OCM. A second approach is to build an OCM that feeds its output signals directly to the electronics that control the WSS. The advantage of this approach is that the servo algorithm becomes part of the system design, the stability of the overall system can be optimized, and the integration of electronics saves costs. The benefits of an optical integration have not been previously realized because of the difficulty in achieving the same performance and stability in the above approaches through the use of passive components in a free-space optics system without significantly increasing the cost.

Thus, there is a need in the art, for optical integration of passive components with improved performance while reducing both size and cost.

BRIEF DESCRIPTION OF THE DRAWINGS

The teachings of the present invention can be readily understood by considering the following detailed description in conjunction with the accompanying drawings, in which.

SUMMARY OF THE INVENTION

Figure 1A:
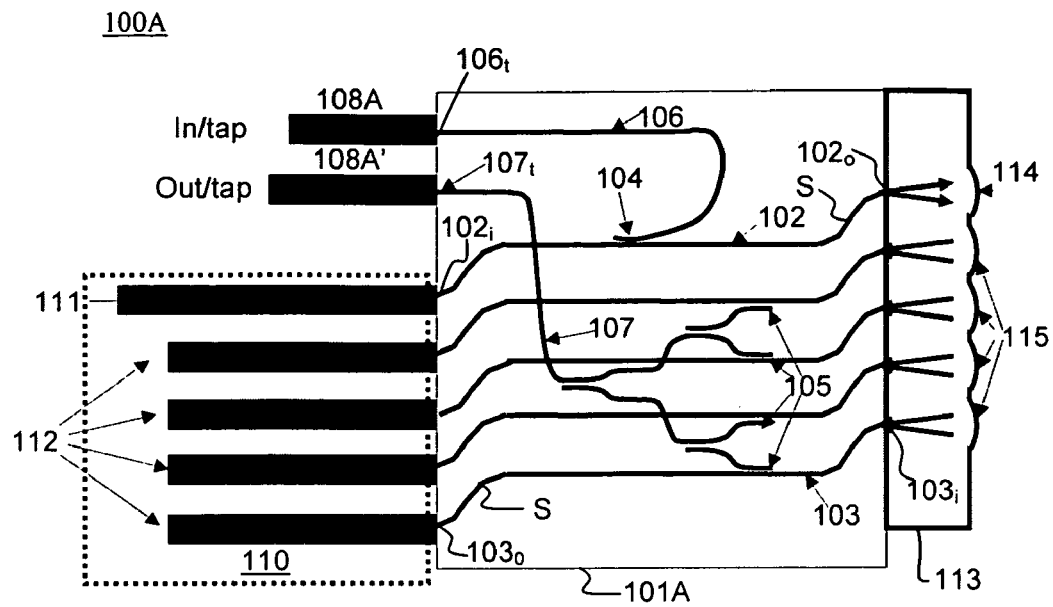
FIG. 1A is a diagram of an optical apparatus consisting of a planar light-wave circuit (PLC) inserted between the fiber array and the lens array of a fiber collimator according to an embodiment of the present invention.

The disadvantages associated with the prior art are overcome by embodiments of the present invention. In embodiments of the present invention a planar light wave circuit (PLC) may generally be adapted to be terminated by fibers for all inputs and outputs. A PLC in general is not a part of free-space optics. In embodiments of the invention a PLC may be integrated with free-space optics and perform functions that cannot be performed using free-space optical taps.

According to a first embodiment, a planar light wave circuit (PLC) includes waveguide paths that optically couple optical signals between fiber ports and corresponding free space optical components, such as lenses. The PLC may optically tap portions of these optical signals by means of optical taps. Tapped signals from the optical taps are coupled to a tap fiber through one or more tap paths implemented in the PLC. Each optical tap may be located within the PLC such that an optical signal is tapped after it is coupled into a waveguide path instead of being tapped before it enters the waveguide. By tapping the signal in this way, the tapped signal represents an actual usable optical signal.

According to a second embodiment, an optical apparatus may include a PLC integrated between a fiber collimator array and a corresponding lens array. The PLC consists of input waveguide paths that optically couple optical signals between input fibers of the fiber array and corresponding input lenses of the lens array, as well as output waveguide paths that optically couple optical signals between output fibers of the fiber array and corresponding output lenses of the lens array. The PLC optically taps these input and output signals through the use of respective input and output taps. These tapped signals are then optically coupled from the input or output taps to the input tap fiber or output tap fiber through a single input tap path or a single output tap path.

According to a third embodiment, an optical apparatus consisting of a PLC integrated between a fiber collimator array and its corresponding lens array coupled with a wavelength switching system (WSS). The WSS receives the optical signals leaving the lens array and passes it through an anamorphic beam expander, a grating, and a focusing lens before reaching a mirror array. The anamorphic beam expander functions as a relay system adapted to receive one or more optical signals from the lenses, the anamorphic system being formed to convert the optical signals to spectral beams having a predetermined elongated beam profile. The grating further processes these spectral beams by separating the spectral beams into constituent spectral channels. The focusing lens then focuses these spectral channels on a mirror array. Many micromirrors compose the mirror array, and function to redirect these spectral channels to corresponding output fibers in the fiber collimator array.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

According to embodiments of the present invention, passive optical functions may be realized by a standard photonics light-wave circuit (PLC) integrated into a fiber collimator array that provides input/output ports to an optical device, such as a wavelength selective switch. This approach removes much of the optical interface while reducing costs and improving the system performance.

A PLC generally comprises one or more waveguide paths formed by planar patterns of a high refractive index core material surrounded with a lower refractive index cladding material. Optical signals are mostly confined within the core region when passing through the PLC. However, a portion of the optical signal may leak out through the cladding, as an evanescent wave. By bringing a high-index optical tap path sufficiently close to the waveguide path, a portion of the signal in the waveguide path may be coupled into the tap path and travel towards a tap fiber.

FIG. 1A is a diagram of an optical apparatus 100A according to a first embodiment of the present invention. The apparatus 100A generally includes a planar light-wave circuit (PLC) 101A integrated between a fiber array 110 and a free space optical component such as a lens array 113. Contained within the PLC 101A is an input waveguide path 102 that optically couples an optical signal between an fiber port $102_i$ and an free space optical component port $102_o$. Each of the fiber ports is $102_i$ is configured to optically couple an optical fiber to a corresponding waveguide path 102. Each of the free space optical component ports $102_o$ is configured to optically couple a free space optical component to the corresponding waveguide path 102.

By way of example, a fiber 111 of the fiber array 110 may be coupled to the fiber port $102_i$ and a corresponding input lens 114 of the lens array may be coupled to a corresponding free space optical component port $102_o$. As used herein the term "port" refers to an end of a waveguide path configured to allow optical signals to be coupled into or out of the waveguide path. As used herein, the term free space optical component includes any optical component that receives optical signals from a free space medium or transmits optical signals to a free space medium.

The PLC 101A contains multiple output waveguide paths 103 that optically couple optical signals between one or more free space component ports $103_i$ and one or more fiber ports $103_o$. By way of example, the waveguide paths 103 may optically couple optical signals from the output fibers 112 of the fiber array 110 to corresponding lenses 115 of a lens array 113. In some embodiments, the waveguide paths 103 may make one or more S-turns between the fiber array 110 and the lenses 115 to ensure that all of the unguided optical energy has left the waveguide paths 103 before tapping occurs. This allows the optical apparatus to account for coupling losses in the waveguide. It is important to point out that, for most applications, it is not proper to tap the optical signal before the unguided optical energy is nearly removed from the waveguide paths 103. For this reason it is not preferred to tap the optical signal prior to the lens array 113 since the coupling loss to the waveguide, in that case, would not be accounted for. By using a PLC as described herein, the coupling loss to the waveguide may be taken into account and signals may be tapped between the fiber array 110 and the lens array 115.

In some embodiments, an S-turn may be included on the input waveguide path 102 between the input fiber 111 and the input tap 104. However, if the coupling loss between the fiber and the waveguide path 102 is small, such an S-turn is not critical.

The PLC 101A may include one or more optical taps 104, 105 that tap the optical signals traveling through the waveguide paths 102, 103 after the optical signals have been coupled into the waveguide and the unguided optical energy has been removed from the waveguide. By way of example, and without loss of generality, an input optical tap 104 may be used to tap a fixed known proportion of the optical signal traveling the input waveguide path 102 after the unguided optical energy has been removed from the waveguide path 102. This tapped input optical signal then travels through a single input optical tap path 106 before being coupled to an input tap fiber 108A at a tap port $106_t$. Likewise, output optical taps 105 may be used to tap fixed known proportions of the optical signals traveling the output waveguide paths 103 after the unguided optical energy has been removed from the waveguide. The tapped output optical signals then travel through a single output tap path 107 before arriving at a tap port $107_t$ where the signal is coupled to the output tap fiber 108A'. An optical channel monitor (OCM) may be optically coupled to the input tap fiber 108A and output tap fiber 108A' to control the tapped optical signals traveling through the fibers. Although the combiner is exemplified by directional couplers, other implementations such as star couplers could be used. In addition, the apparatus 100A shows one input fiber and one or more output fibers. The operation can be reversed if the tap devices are properly reversed.

Figure 1B:
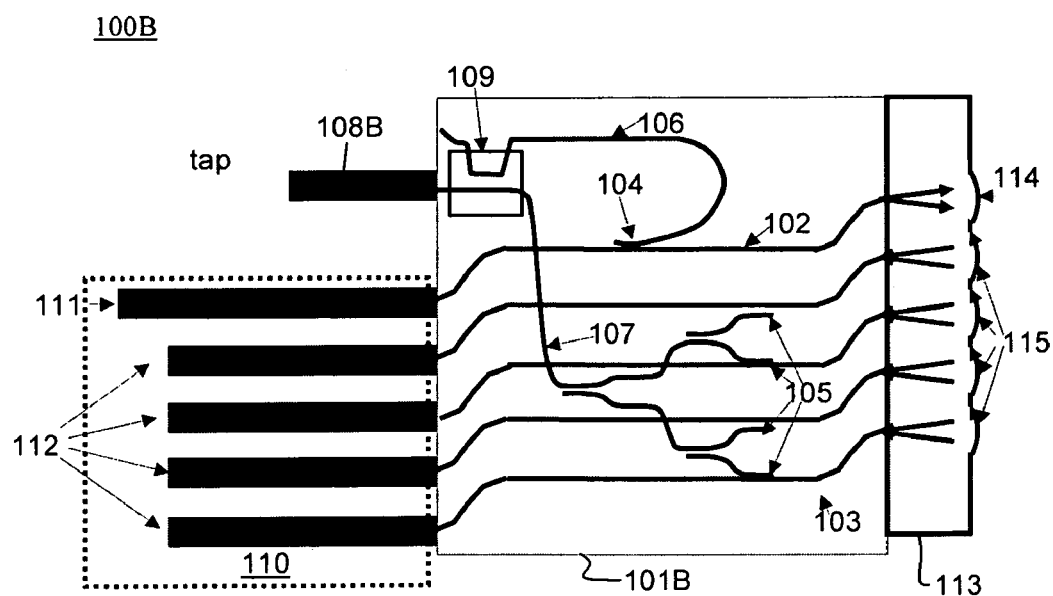
FIG. 1B is a diagram of an optical apparatus consisting of a planar light-wave circuit (PLC) with a switch inserted between the fiber array and the lens array of a fiber collimator according to an embodiment of the present invention.

FIG. 1B is a diagram of an optical apparatus 100B according to variation of the embodiment depicted in FIG. 1A. The apparatus 100B generally includes a planar light-wave circuit (PLC) 101B, having a switch 109, inserted between the fiber array 110 and the lens array 113 of a fiber collimator. The PLC works similarly to that described in FIG. 1A, but is slightly modified with the addition of the switch 109. The PLC includes an input waveguide path 102 that optically couples an optical signal from the input fiber 111 of the fiber array and the corresponding input lens 114 of the lens array 113. The PLC also includes one or more output waveguide paths 103 that optically couple optical signals from output fibers 112 output lenses 115 of the lens array. In some embodiments, the waveguide paths 102, 103 may make S-turns between the fiber array and the lens array 113 to ensure that all of the unguided optical energy has left the waveguide before tapping occurs.

The PLC 101B may be used to tap the optical signals traveling through the waveguide paths 102, 103 after the optical signals have been coupled into the waveguide and unguided optical energy has been removed from the waveguide paths. The PLC 101B includes an input optical tap 104 configured to tap a fixed known proportion of the optical signal traveling through the input waveguide path 102 after the unguided optical energy has been removed from the waveguide. The tapped input optical signal then travels through a single input tap path 106 to the switch 109. Likewise, output optical taps 105 are used to tap fixed known proportions of the optical signals traveling through the output waveguide paths 103 after the unguided optical energy has been removed from the waveguide. The tapped output signals then travel through a single output tap path 107 to the switch 109. The switch 109 controls whether the input optical signal or output optical signals reach the tap fiber 108B. Upon arriving at the tap fiber 108B, the optical signals can be optically coupled to an optical channel monitor (OCM). This configuration allows tapping of both the input and output signals with a single tap fiber 108B.

Figure 2:
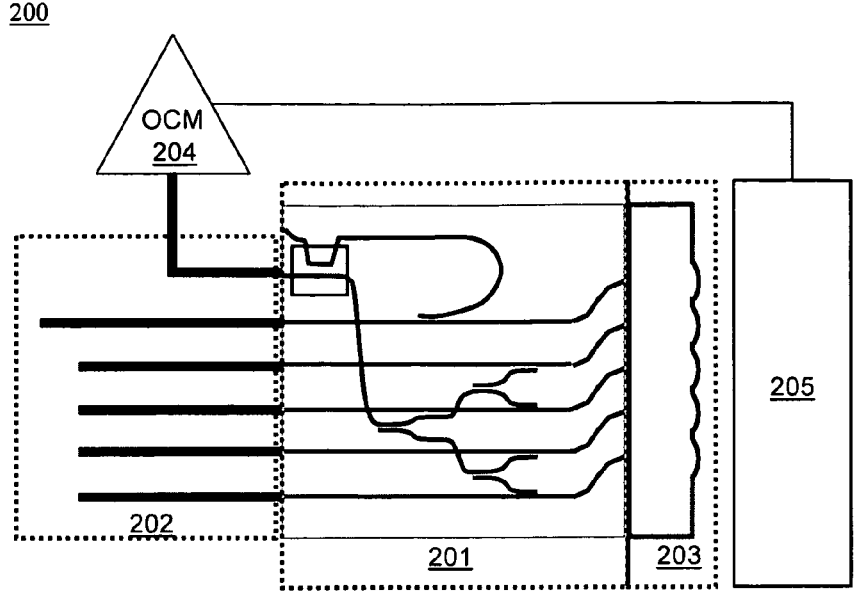
FIG. 2 is a block diagram of the optical apparatus described in FIG. 1B being monitored by an OCM according to an embodiment of the present invention.

FIG. 2 is a block diagram 200 of the optical apparatus described in FIG. 1B being monitored by an OCM according to an embodiment of the present invention. The optical apparatus contains a PLC 201 between a fiber array 202 and a lens array 203. The PLC 203 may include input/output waveguide paths, input/output optical taps, input/output optical tap paths, a switch, and tap paths as described in FIG. 1A or FIG. 1B. Optical signals travel between the PLC 201 and a free space optical device 205 by a lens array. The optical signal in the tap fiber may be monitored by an optical channel monitor (OCM) 204, which uses the signals for feedback control of the optical device 205 in response to an optical signal received from one or more tap fibers in the fiber array 202. By way of example, the free space optical device 205 may be a wavelength selective optical switch (WSS). In alternative embodiments the optical device 205 may be, e.g., some other type of optical switch, an optical attenuator (e.g., a two-port attenuator or a multiple input arrayed optical attenuator) or a wavelength blocker (e.g., a two-port wavelength blocker).

Figure 3A:
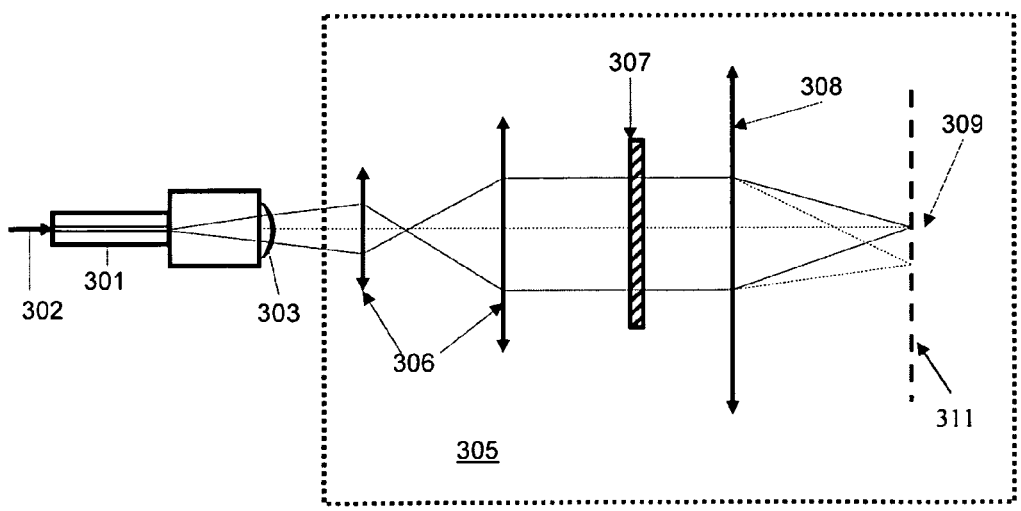
FIG. 3A is a top view of the optical apparatus in FIG. 1B optically coupled to a wavelength switch system (WSS) according to an embodiment of the present invention.
Figure 3B:
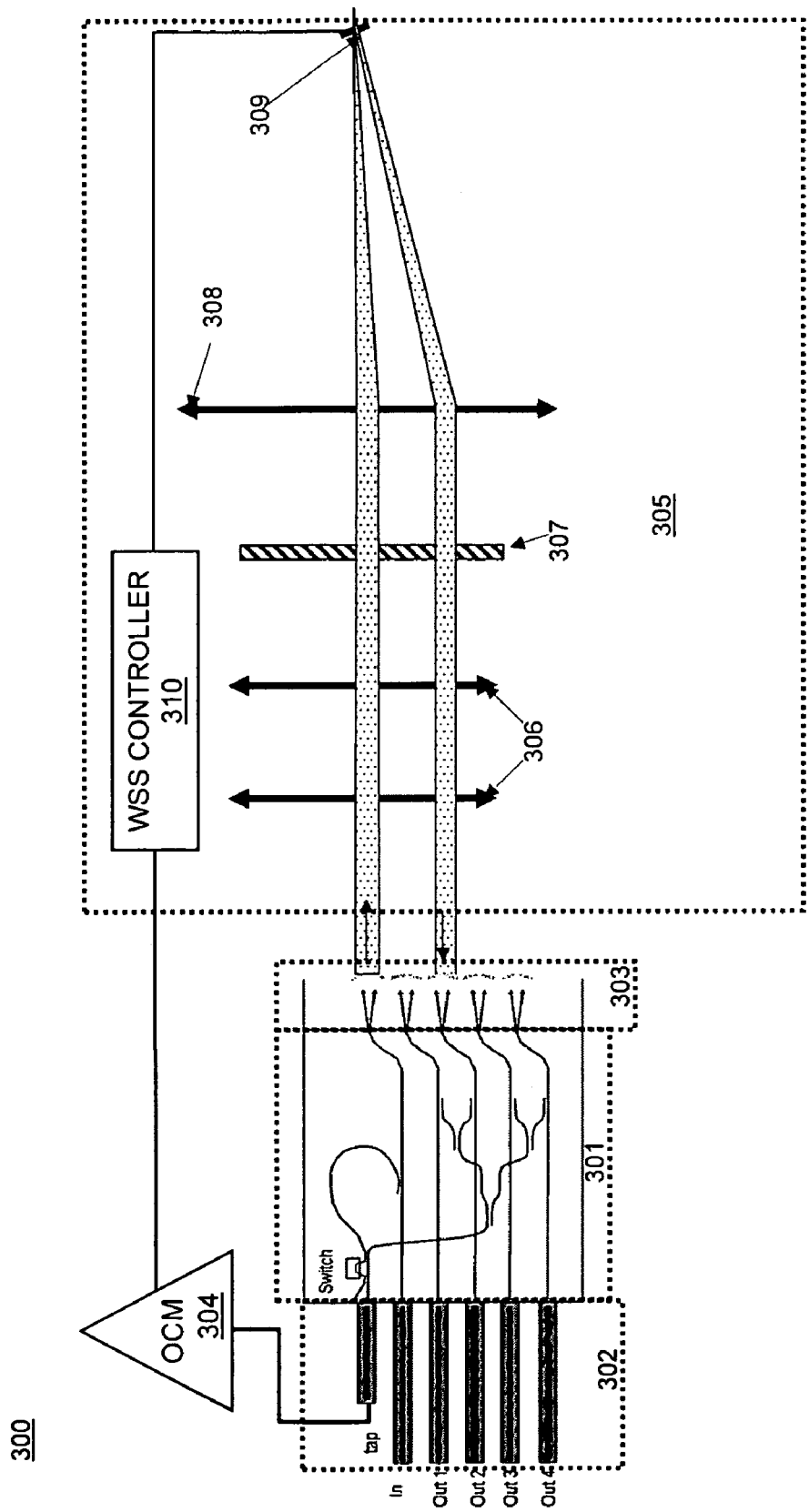
FIG. 3B is a cross section of the optical apparatus in FIG. 1B optically coupled to a WSS according to an embodiment of the present invention.

FIGS. 3A-3B illustrate an optical apparatus 300 according to another embodiment of the present invention. By way of example, the apparatus 300 may include a planar light circuit (PLC) 301 of the type shown in FIG. 1B optically coupled between a fiber array 302 and a collimator lens array 303. The lens array 303 is optically coupled to a wavelength switch system (WSS) 305. The PLC 301 may include a switch inserted between the fiber array 302 and the lens array 303. The PLC 301 couples optical signals between the fiber array 302 and the lens array 303 and also functions to couple optical signals between the input/output optical taps and the tap fiber through a switch, e.g., as described in FIG. 1B. The PLC 301 includes input/output waveguide paths, input/output optical taps, input/output tap paths, a tap fiber, and a switch, which may be configured as shown in FIG. 1B and described above with respect thereto. The waveguide paths and tap paths of the PLC 301 align at one end to corresponding lenses in the lens array 303, which includes input/output lenses that couple optical signals into and out of the WSS 305. The waveguide paths and tap paths align at another end to corresponding optical fibers of the fiber array 302 as described in FIG. 1B.

The WSS 305 may be configured to switch optical signals of different wavelengths that leave the lens array 303, by directing them towards different fibers of the fiber array 302. By way of example, the WSS 305 may include an anamorphic beam expander 306, a diffraction grating 307, focusing optics 308, and a channel mirror array 309 to achieve this task. The optical signals that enter the PLC from the input fibers in the fiber array are coupled to the WSS by the lens array 303. After entering the WSS, the signals encounter the anamorphic beam expander 306, which converts the optical signals to spectral beams having a predetermined elongated beam profile. These spectral beams then pass through a diffraction grating 307, which spatially separates the spectral beams into constituent spectral channels. These constituent spectral channels are then focused towards the mirror array 309 through a focusing lens 308. The mirror array 309 may include micromirrors 311 positioned to receive the constituent spectral channels leaving the focusing lens 308. Each micromirror may rotate about a switching axis to switch the spectral channels to a selected lens in the lens array corresponding to a selected output fiber of the fiber array 302. Examples of suitable WSS designs are described in detail, e.g., in commonly assigned U.S. Pat. Nos. 6,625,346, 6,661, 948, 6,697,431, 7,164,859, and 7,263,253, which are all incorporated herein by reference.

The WSS 305 may include a controller 310 coupled to the channel mirror array to control the rotation of the mirrors about switching and attenuation axes. An optical channel monitor 304 may be coupled to a tap fiber of the fiber array 302. Optical signals received from the tap fiber may be used in a feed back loop with the controller 310 to control the mirror array.

Figure 4A:
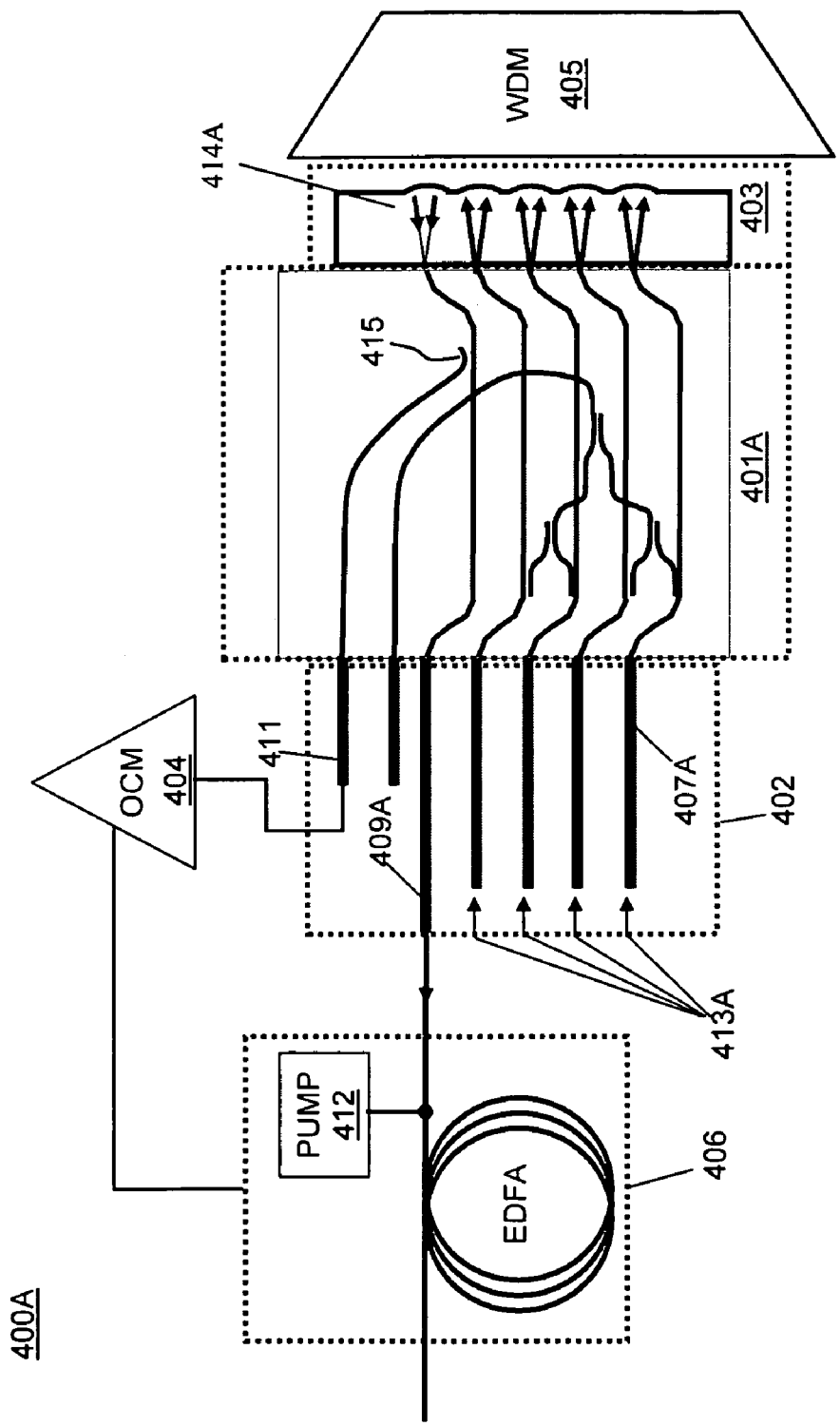
FIG. 4A is a schematic diagram of the optical apparatus in FIG. 1B optically coupled to a wavelength multiplexer (WDM) and further modified by an erbium doped fiber amplifier (EDFA)

There are many variations on the embodiments described above. By way of example, FIG. 4A is a schematic diagram of an optical apparatus 400A including a PLC 401A optically coupled between a fiber array 402 and a lens array 403 optically coupled to a free-space wavelength division multiplexer (WDM) 405. The lens array 403 comprises lenses that correspond to the fibers of the fiber array 402, as described in FIG. 1B. The lens array 403 contains a plurality of lenses with each lens aligned between a corresponding one of the optical fibers in the fiber array 402 and an end of a corresponding one of the waveguide paths in the PLC 401A. In this embodiment, the fiber array 402 includes input fibers 407A that receive input optical signals characterized by different carrier wavelengths. The input optical signals 413A are coupled by the PLC 401A and lens array 403 to the WDM 405. The optical signals coupled from the fibers of the fiber array 402 into WDM 405 via the waveguide paths in the PLC 401A and the lenses in the lens array 403. The WDM 405 combines the optical signals from the different fibers 414A in the lens array 403 and directs them into a single output fiber 409A. The WDM may include optical filtering devices such as etalons, stable solid-state single-frequency Fabry-Perot interferometers in the form of thin-film-coated optical glass for combining signals of different wavelengths. Due to losses in the fiber, the multiplexed output signal may need to be amplified at regular distances. To this end, the output fiber 409A may be coupled to an optical amplifier 406, such as an erbium doped fiber amplifier (EDFA).

The PLC 401A may include an optical tap 415 that taps a portion of the combined output signal and couple this portion to an output tap fiber 411. By way of example, the PLC 401A may accomplish this task through input/output waveguide paths, input/output optical taps, input/output optical tap paths, a switch, and a tap fiber that are configured as described in FIG. 1B. The tap fiber 411 may be coupled to an optical channel monitor 404 that provides a feed-forward control signal proportional to the intensity of the combined output signal. The control signal provided to pump source 412 that provides pump radiation to the optical amplifier 406. Such a configuration may be useful, e.g., where the EDFA amplifies the signal prior to transmission over a long haul fiber.

Figure 4B:
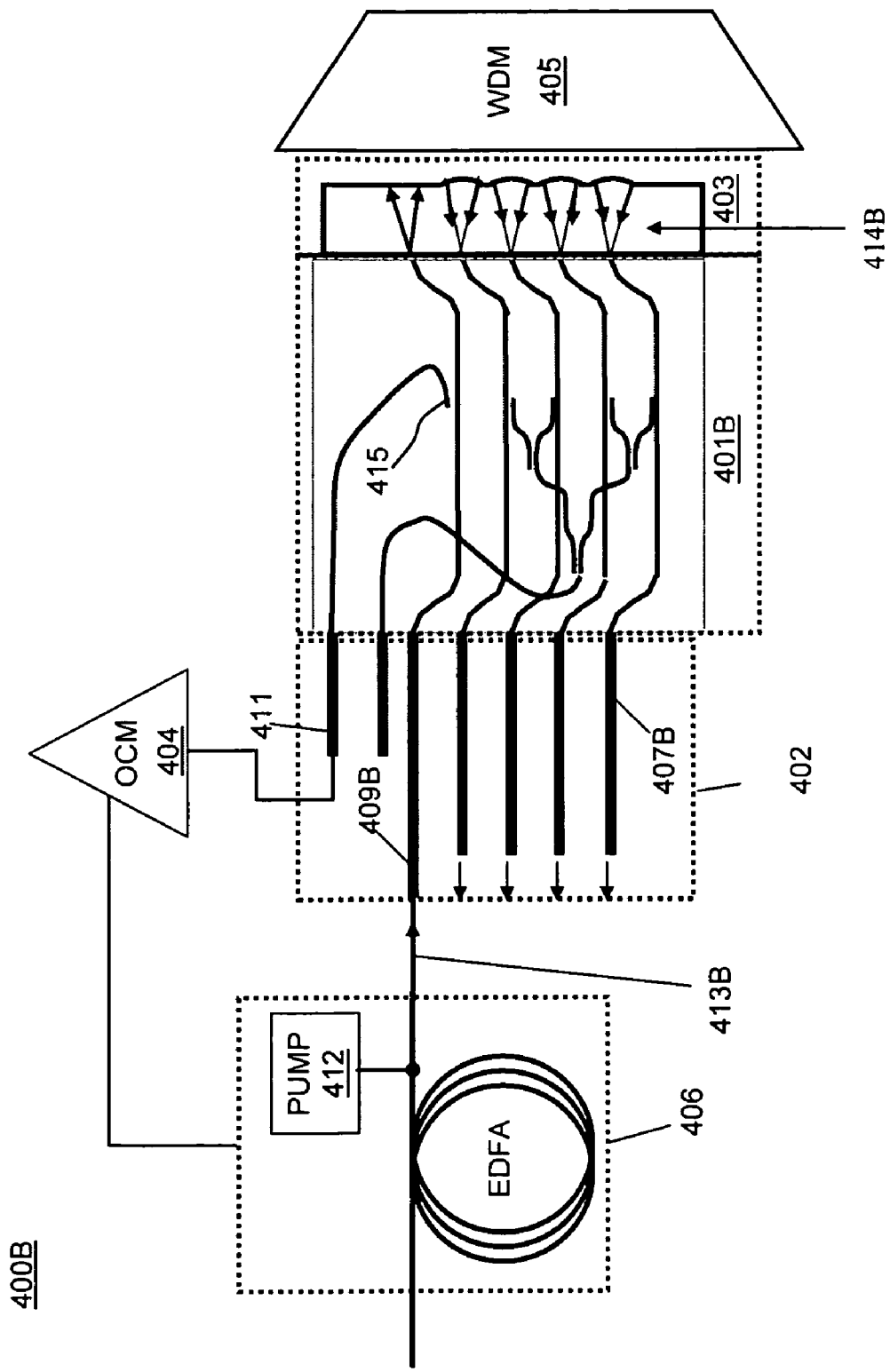
FIG. 4B is a schematic diagram of the optical apparatus in FIG. 1B optically coupled to a wavelength multiplexer (WDM) and further modified by an erbium doped fiber amplifier (EDFA)

In alternative embodiments, an optical apparatus of the type shown in FIG. 4A may operate in reverse as shown in FIG. 4B. Specifically, a multiplexed input signal 413B may be fed to the WDM 405 via an input fiber 409B in the fiber array, which de-multiplexes the input signal into constituent channels 414B, which are coupled to the output fibers 407B by the PLC 401B. An optical tap 415 in a PLC 401B may couple a portion of the multiplexed input signal to the optical channel monitor 404, which produces a feedback control signal to an EDFA coupled to the far end of the input fiber.

As may be seen from the foregoing, embodiments of the present invention provide for optical integration of passive components, such as optical taps, with improved performance while reducing both size and cost.

While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. An optical apparatus, comprising:
a fiber array consisting of one or more optical fibers; a lens array consisting of one or more lenses corresponding to the optical fibers of the fiber array;
one or more waveguide paths optically coupled in a planar light-wave circuit between one or more optical fibers in the fiber array and one or more corresponding lenses in the lens array;
wherein the planar light-wave circuit includes: one or more optical taps optically coupled to the one or more waveguide paths between the fiber array and the lens array; and one or more tap paths configured to couple between the one or more optical taps and the one or more tap fibers, wherein each optical tap is located such that an optical signal is tapped after it is coupled into one of the waveguide paths; and
wherein one or more waveguide paths include: at least one waveguide path coupled between an optical fiber in the fiber array and a lens in the lens array, wherein the waveguide path includes a turn between the optical fiber and the lens array configured to separate unguided optical energy from the waveguide path before tapping occurs.

2. The optical apparatus of claim 1, wherein the fiber array includes an input fiber and an output fiber.

3. The optical apparatus of claim 2, wherein one or more waveguide paths of the planar light-wave circuit include: an input waveguide path optically coupled between the input fiber and a first lens; and an output waveguide path optically coupled between the output fiber and a second lens.

4. The optical apparatus of claim 3, wherein one or more optical taps of the planar light-wave circuit include: an input optical tap optically coupled to the input waveguide path; and an output optical tap optically coupled to the output waveguide path.

5. The optical apparatus of claim 4, wherein the one or more tap paths include: an input tap path configured to couple between the input optical tap and the input tap fiber.

6. The optical apparatus of claim 4, wherein the one or more tap paths include an output tap path configured to couple between the output optical tap and the output tap fiber.

7. The optical apparatus of claim 3, further comprising an optical channel monitor optically coupled to one or more of the tap paths.

8. The optical apparatus of claim 7, further comprising an optical amplifier optically coupled to an optical fiber in the fiber array and operably coupled to the optical channel monitor.

9. The optical apparatus of claim 1, wherein one or more lenses include an anamorphic lens array.

10. The optical apparatus of claim 1, further comprising a free space optical device optically coupled to the lens array.

11. The optical apparatus of claim 10 wherein the free space optical device is a wavelength selective switch.

12. The optical apparatus of claim 10 wherein the free space optical device is a wavelength division multiplexer.

13. The optical apparatus of claim 10, further comprising an optical channel monitor optically coupled to one or more the tap fibers, wherein the optical channel monitor is configured to control the optical device in response to an optical signal received from the tap fiber.

14. The optical apparatus of claim 13 wherein the free space optical device is a wavelength selective switch.

15. The optical apparatus of claim 2, wherein the turn between the optical fiber and the lens array is an S-turn.

* * * * *